United States Patent [19]
Norris

[11] Patent Number: 5,889,870
[45] Date of Patent: Mar. 30, 1999

[54] ACOUSTIC HETERODYNE DEVICE AND METHOD

[75] Inventor: Elwood G. Norris, Poway, Calif.

[73] Assignee: American Technology Corporation, Poway, Calif.

[21] Appl. No.: 684,311

[22] Filed: Jul. 17, 1996

[51] Int. Cl.⁶ .................................................. H04B 3/00
[52] U.S. Cl. ................................................. 381/77; 381/79
[58] Field of Search ..................................... 381/79, 77, 82

[56] References Cited

U.S. PATENT DOCUMENTS

| | | |
|---|---|---|
| 1,616,639 | 2/1927 | Sprague . |
| 1,951,669 | 3/1934 | Ramsey . |
| 2,461,344 | 2/1949 | Olson . |
| 3,012,222 | 12/1961 | Hagemann . |
| 3,398,810 | 8/1968 | Clark, III . |
| 3,612,211 | 10/1971 | Clark, III . |
| 3,613,069 | 10/1971 | Cary et al. . |
| 3,641,421 | 2/1972 | Stover . |
| 3,710,332 | 1/1973 | Tischner et al. . |
| 3,723,957 | 3/1973 | Damon . |
| 3,742,433 | 6/1973 | Kay et al. . |
| 3,836,951 | 9/1974 | Geren et al. . |
| 4,207,571 | 6/1980 | Passey . |
| 4,245,136 | 1/1981 | Krauel, Jr. . |
| 4,378,596 | 3/1983 | Clark . |
| 4,418,404 | 11/1983 | Gordon et al. . |
| 4,593,160 | 6/1986 | Nakamura . |
| 4,823,908 | 4/1989 | Tanaka et al. . |
| 4,991,148 | 2/1991 | Gilchrist . |
| 5,317,543 | 5/1994 | Grosch . |
| 5,357,578 | 10/1994 | Tanishi . |

OTHER PUBLICATIONS

Ultrasonic Ranging System—Polaroid.
Helmholtz (Excerpts from On Combinaton Tones)—Editor's Comments on Paper 16.
Aoki, K., et al., "Parametric Loudspeaker—Charateristics of Acoustic Field and Suitable Modulation of Carrier Ultrasound," *Electronics and Communications in Japan*, Part 3, vol. 74, No. 9, pp. 76–82 (1991).
Makarov, S.N., et al., "Parametric Acoustic Nondirectional Radiator," *Acustica*, vol. 77, pp. 240–242 (1992).
Westervelt, P.J., "Parametric Acoustic Array," *The Journal of the Acoustic Society of America*, vol. 35, No. 4, pp. 535–537 (1963).

*Primary Examiner*—Forester W. Isen
*Attorney, Agent, or Firm*—Thorpe, North & Western, LLP

[57] ABSTRACT

The present invention is the emission of new sonic or subsonic compression waves from a region resonant cavity or similar of interference of at least two ultrasonic wave trains. In one embodiment, two ultrasonic emitters are oriented toward the cavity so as to cause interference between emitted ultrasonic wave trains. When the difference in frequency between the two ultrasonic wave trains is in the sonic or subsonic frequency range, a new sonic or subsonic wave train of that frequency is emitted from within the cavity or region of interference in accordance with the principles of acoustical heterodyning. The preferred embodiment is a system comprised of a single ultrasonic radiating element oriented toward the cavity emitting multiple waves.

6 Claims, 7 Drawing Sheets

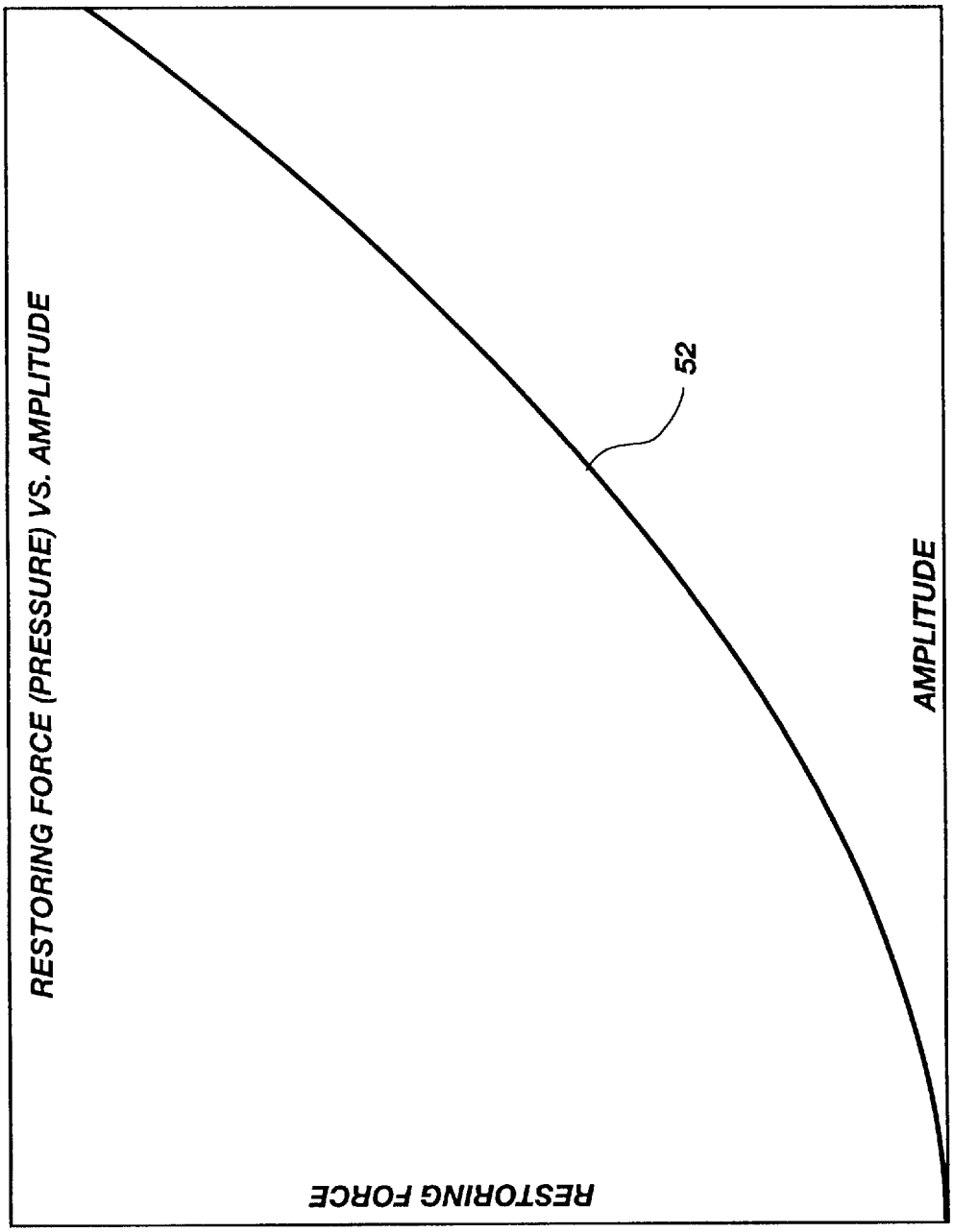

5,889,870

ACOUSTIC HETERODYNE DEVICE AND METHOD

BACKGROUND OF THE INVENTION

1. Field of the Invention

This invention pertains to compression wave generation. Specifically, the present invention relates to a device and method for indirectly generating a new sonic or subsonic compression wave without the use of a direct radiating element at the source of the new compression wave generation.

2. State of the Art

Sound waves in general are wave-like movements of air or water molecules. Because these media are elastic and generally homogeneous, naturally occurring sound travels in all directions radially from the source of generation. A voice, instrument or impact, for example, will radiate omni-directionally in a unitary, integrated form, carrying multiple frequencies, overtones, and a full range of dynamics that collectively contribute to an instantaneous sound perception at the ear. This perception of naturally occurring sound at a healthy ear is deemed to be "pure" when it corresponds to the same acoustic content that existed at the point of origin.

Because sound is a transient, temporary state of motion within a media, it is not self-sustaining. Indeed, the first and second laws of thermodynamics require that the sound eventually dissipate its motion into heat or other forms of energy. Therefore, if storage or preservation of the sound is desired, it is necessary to transmute such motion into a fixed form of recording. This fixed form can then be recovered later by conversion of the fixed form back into sound waves.

In the earliest experiences of recording, mechanical devices were moved by impact of the sound waves to inscribe or etch a corresponding grove into a plate. By positioning a needle or other tracking device over a set of moving grooves, crude reproduction of the original sound waves was accomplished. More sophisticated technologies have developed which enable capture of sound waves in other fixed forms such as magnetic, electronic, and optical media. Nevertheless, the same principle of sound reproduction has been applied to recover this stored information, whether the response is generated by a mechanical mechanism or by digitally controlled laser reading devices. Specifically, stored signal is converted back to sound waves by recreating movement of an object, which then sets the surrounding air into motion corresponding to sound reproduction.

A primary goal of modern acoustic science is to reproduce pure sound, based on conversion of the electronic, magnetic, mechanical or optical record into compression waves which can be detected at the ear. The ideal system would play all original sound back through a resonating device comparable to that which produced the sound in the beginning. In other words, the violin sounds would be played back through a violin, regenerating the overtones and a myriad of other dynamic influences that represent that instrument. Similarly, a piccolo would be played back through a device that generates the high frequencies, resonance aspects and overtones associated with this type of instrument. In short, one cannot expect a viola to sound like a viola in "pure" form if sound reproduction is actuated by a mechanical wave generating device that does not embody unique characteristics of that instrument or voice. Accordingly, it would seem that the only practical way to reproduce the original "pure" quality of sound would be to isolate each instrument or source, record its sound output, and then reproduce the output into the same instrument or acoustic resonator. It is apparent that such a solution is totally impractical.

In the real world, the challenge of reproducing sound has been allocated to the speaker. The operation of a loudspeaker is relatively simple to understand when the interaction of the components is explained. A speaker is a transducer which receives energy in one form (electrical signals representative of sound) and translates the energy to another form (mechanical vibration). In a dynamic loudspeaker, an electrical current that is proportional to the strength and frequency of the signal to be broadcast is sent through a coil attached to a rigid membrane or cone. The coil moves inside a permanent magnet, and the magnetic field exerts a force on the coil that is proportional to the electrical current. The oscillating movement of the coil and the attached membrane sets up sound waves in the surrounding air. In brief, reproduction of sound has heretofore required mechanical movement of a diaphragm or plate. To expect a single diaphragm or plate to accurately supply both the shrill sound of the piccolo and the deep resonance of the base drum would indeed be unreasonable.

It is important to note, however, that when the listener at a live performance of a symphony hears this broad range of sound, he receives it in an integrated manner as a "unified" combination of sound waves, having a myriad of frequencies and amplitudes. This complex array is responsively promulgated through the air from its originating source to an ear that is incredibly able to transfer the full experience to the brain. Indeed, the full range of audible signal (20 to 20,000 Hz) is processed as a unified experience, and includes effects of subsonic bass vibrations, as well as other frequencies which impact the remaining senses.

It is also important to note that this same "pure" sound that arrives at the ear, can be detected by a microphone and consequently recorded onto a fixed media such as magnetic tape or compact disc. Although the microphone diaphragm may not have the sensitivity of a human ear, modern technology has been quite successful in effectively capturing the full range of sound experience within the recorded signal. For example, it is unnecessary to provide separate microphones for recording both low and high range frequencies. Instead, like the ear drum, the microphone, with its tiny sensing membrane, captures the full audio spectrum as a unified array of sound waves and registers them as a composite signal that can then be recorded onto an appropriate media.

It is therefore clear that the microphone is not the primary limitation to effective storage and subsequent reproduction of "pure" sound. Rather, the challenge of accurate sound reproduction arises with the attempt to transform the microphone output to compression waves through a mechanical speaker. Accordingly, the focus of effort for achieving a high quality unified sound system has been to develop a complex speaker array which is able to respond to high, medium and low range frequencies, combining appropriate resonance chambers and sound coupling devices, to result in a closer simulation of the original sound experience.

This quest for improved sound reproduction has included studies of problems dealing with (a) compensating for the mass of the speaker diaphragm, (b) the resistance of air within an enclosed speaker, (c) the resonant chamber configuration of the speaker, (d) the directional differences between high and low frequencies, (e) the phase variation of low versus high frequency wave trains, (f) the difficulty of coupling speaker elements to surrounding air, and (g) the loss of harmonics and secondary tones. Again, these aspects represent just a few of the problems associated with reconstructing the sound wave by means of a direct radiating physical speaker.

As an example of just one of these issues, overcoming the mass of a speaker driver has remained a challenging problem. Obviously, the purpose of the speaker driver and diaphragm is to produce a series of compression waves by reciprocating back and forth to form a wave train. The initial design challenge is to compensate for resistance against movement in speaker response due to inertia within the speaker mass itself. Once the speaker driver is set in motion, however, the mass will seek to stay in motion, causing the driver to overshoot, requiring further compensation for delayed response to reverse its direction of travel. This conflict of mass and inertia recurs thousands of times each second as the speaker endeavors to generate the complex array of waves of the original sound embodied in the electrical signal received.

In order to meet the difficulty of compensating for mass, as well as numerous other physical problems, speaker development has focused mainly on improving materials and components as opposed to developing a different concept of sound generation. Diaphragm improvements, cone construction materials, techniques and design, suspensions, motor units, magnets, enclosures and other factors have been modified and improved. Nevertheless, the basic use of a reciprocating mass remains unchanged, despite an efficiency of less than 5 percent of the electrical power being converted to acoustic output.

Electrostatic loudspeakers represent a different methodology. Unlike the electrodynamic loudspeaker with its cone shaped diaphragm, the electrostatic loudspeaker uses a thin electrically conducting membrane. Surrounding the plate are one or more fixed grids. When a signal voltage is applied to the elements, the electrostatic force produced causes the diaphragm to vibrate. This low-mass diaphragm is particularly useful as a high-frequency radiating element, and its operation can be extended to relatively low frequencies by the use of a sufficiently large radiating area.

Although electrostatic speakers offer some advantages, they are large, expensive, inefficient and suffer from the lack of point source radiated sound. For example, sound detection is accomplished by a microphone at a localized or approximate point source. To convert the detected sound to a non-point source, such as a large electrostatic diaphragm, may create unnatural sound reproduction. Specifically, a radiating electrostatic speaker 5 feet in height is limited in its ability to simulate the delicate spatial image of a much smaller piccolo or violin.

Another issue in loudspeaker design is that the optimum mass and dimensions for low frequency radiating elements differ radically from those for high frequency. This problem is typically addressed by providing both woofer and tweeter radiating elements for each channel of a loudspeaker system. The implications of this design are highly undesirable. The phase shift introduced because of the differences in time delay for high frequency signals traveling (i) the shorter distance of the cone of a tweeter to a listener, versus (ii) the substantially longer path for low frequency signals from the horn or woofer speaker to a listener's ear, can be in the range of thousands of percent in phase differential.

The preceding discussion of speaker technology is recited primarily to emphasize the historical difficulty of changing a stored form of sound to a compression wave capable of reproducing sound in its original form. Nevertheless, the prior art has been virtually dominated for sixty years by the concept that mechanical systems, such as speakers, are required to reproduce audible sound. Clearly, it would be very desirable to provide a means of sound reproduction which adopts a different approach, avoiding the many difficulties represented by the choice of moving a diaphragm or speaker in order to generate sound.

OBJECTS AND SUMMARY OF THE INVENTION

It is an object of the present invention to provide a method and apparatus for indirectly emitting new sonic and subsonic wave trains from a region of air without using a direct radiating element to emit the wave trains.

It is another object to indirectly generate at least one new sonic or subsonic wave train by using a by-product of interference between at least two ultrasonic signals having different frequencies equal to the at least one new sonic or subsonic wave train.

It is still another object to cause at least two ultrasonic wave trains to interact in accordance with the principles of acoustical heterodyning to thereby extract intelligence from the interfering wave trains.

It is yet another object to indirectly generate new sonic or subsonic wave trains by combining them with an ultrasonic carrier wave using amplitude modulation, emitting the combined signal from an ultrasonic transducer, causing interference between the carrier wave and another ultrasonic frequency wave train, to thereby create the new sonic or subsonic wave trains.

It is still another object to affect a physical state of a living being utilizing an indirectly created compression wave.

It is still yet another object to generate a new compression wave which is perceptible to human senses using at least two imperceptible compression waves, but without directly propagating the new compression wave.

Yet another object of the invention is to generate a new sonic or subsonic wave train without having to overcome the mass and associated inertial limitations of a conventional direct radiating element.

Still another object of the invention is to generate a new sonic or subsonic wave train without introducing distortions or undesired harmonics otherwise inherent to a conventional direct radiating element.

Another object is to indirectly generate and enhance a new sonic or subsonic wave train from within a resonant cavity by emitting at least two ultrasonic wave trains into the resonant cavity.

Yet another object is to omni-directionally generate a high frequency wave train, thereby avoiding the highly focused and directional nature of high frequency signal emissions typical of a conventional loudspeaker.

Still yet another object is to generate a new sonic or subsonic wave train in a localized area without coupling to an associated environment or enclosure which would otherwise cause undesirable broadcasting of the sonic or subsonic wave train.

Yet another object is to generate a new sonic or subsonic wave train wherein characteristics of the new sonic or subsonic wave train are not limited by the characteristics of a direct radiating element.

Another object of the invention is to emulate a sound wave detection process typical of an approximate point-source detection device such as a microphone, but without providing a physical detection device at a detection location.

Another object is to control the volume of a new sonic or subsonic wave train by manipulating the degree of interaction of the at least two ultrasonic frequency wave trains.

Still another object is to emit a new sonic or subsonic wave train from a region of air as a by-product of modulating a single ultrasonic wave train emitted from a single ultrasonic transducer into the region in accordance with the principles of acoustical heterodyning.

The present invention is embodied in a system which indirectly generates new sonic or subsonic waves trains. In one embodiment, a new sonic or subsonic wave train is emitted from a region of interference of at least two ultrasonic wave trains emitted from at least two ultrasonic transducers. The principle of operation is based on incorporating retrievable intelligence onto an ultrasonic carrier wave. The intelligence is retrieved as the desirable by-product of interference of the ultrasonic carrier wave train and another ultrasonic wave train. The ultrasonic wave trains interfere within a region of non-linearity in accordance with principles identified by the inventor as "acoustical heterodyning," and thereby generate by-products which include the difference and the sum of the two ultrasonic wave trains.

A system which easily demonstrates the principle of acoustical heterodyning comprises two ultrasonic frequency transducers which are oriented so as to cause interference between emitted ultrasonic wave trains. When the difference in frequency between the two ultrasonic wave trains is in the sonic or subsonic frequency range, the difference in frequency is generated as a new, audible sonic or new subsonic wave train emanating outward from within the region of heterodyning interference.

A different embodiment of the system provides the advantage of being comprised of only one ultrasonic direct radiating element. The advantage is not only in the decreased amount of hardware, but the perfect alignment of the two interfering ultrasonic wave trains because they are emitted from the same radiating element. In effect, the new sonic or subsonic wave train appears to be generated directly from the ultrasonic emitter. If it were not for the inescapable conclusion that the ultrasonic emitter cannot itself generate sonic or subsonic frequencies, plus the audible evidence that the sound is not emanating directly from the emitter, one might be deceived.

The importance of the first embodiment is that it teaches the concept of generating a new sonic or subsonic wave train as a result of the interference between two ultrasonic wave trains in accordance with the principles of acoustical heterodyning. In essence, it is easier to see that two ultrasonic wave trains are coming from two ultrasonic emitters. But the principle of acoustical heterodyning taught by this first embodiment prepares the way for understanding how the second embodiment functions. It becomes apparent that the same acoustical heterodyning principle applies when it is understood which wave trains are interfering in space.

A key aspect of the invention is the discovery that by superimposing sonic or subsonic intelligence onto an ultrasonic carrier wave, this intelligence can be retrieved as a new sonic or subsonic wave train. Whether the ultrasonic wave trains are generated from two emitters or from a single emitter, the effect is the same.

Another aspect of the invention is the indirect generation of new compression waves without having to overcome the problems inherent to mass and the associated limitations of inertia of a conventional direct radiating element. The present invention eliminates a direct radiating element as the source of a new compression wave so that the desired sound is generated directly from a region of air and without the several forms of distortion all associated with direct radiating speakers.

Another aspect which is helpful to utilize the present invention is to understand the nature of the transmission medium. More specifically, the region of air in which an acoustical heterodyning effect occurs is referred to as the transmission medium. It is well known that the transmission medium of air provides an elastic medium for the propagation of sound waves. Thus, prior art research has treated air as a passive element of the sound reproduction process. Air simply waits to be moved by a compression wave.

Consequently, little practical attention has been devoted to the nature of air when it behaves non-linearly. In the past, such non-linearity has perhaps been perceived as an obstacle to accurate sound reproduction. This is because it is understood by those skilled in the art that in extreme conditions, air molecules are less and less able to follow the vibration of a compression wave, such as that produced by a diaphragm. Therefore, the tendency of research has been to avoid non-linear conditions.

In contrast, the present invention appears to favor the existence of a non-linear transmission medium in order to bring about the required heterodyning effect. Although air is naturally non-linear when a compression wave moves through it, the degree of non-linearity is relatively unobservable or inconsequential. However, when ultrasonic compression waves are emitted so as to interfere in air, the non-linearity causes a surprising and unexpected result which will be explained and referred to as the acoustical heterodyning effect or process.

The present invention draws on a variety of technologies and aspects which have sometimes perceived as unrelated topics. These aspects of the invention include 1) indirectly generating a new sonic, subsonic or ultrasonic compression wave, 2) superimposing intelligence on an ultrasonic carrier wave and retrieving the intelligence as the indirectly generated compression wave, 3) causing at least two ultrasonic compression waves to interact in air and using the by-product of the interference, 4) using the principle of acoustical heterodyning to indirectly generate the new compression wave, 5) generating the new compression wave from a relatively massless radiating element to avoid the distortion and undesirable harmonics of conventional direct radiating elements, 6) affecting a physical state of a living being by generating subsonic frequencies in close proximity thereto, 7) generating an approximate point-source of sound that is phase coherent over the entire audio spectrum, 8) eliminating distortion in playback or broadcasting of sound, 9) eliminating the "beaming" phenomenon inherent in emission of high frequency compression waves from a direct radiating element, 10) generating a new sonic or subsonic compression wave which is independent of the characteristics of the direct radiating element, and 11) the detection of sound without using a direct detection device at a detection location.

It should be remembered that all of these aspects of the present invention are possible without using a speaker or other form of direct radiating structure. Furthermore, these sonic or subsonic frequencies are generated absolutely free of distortion and in a generally omni-directional orientation. The surprising result is the ability to recreate "pure" sound in the same form as when it was originally captured at a microphone or other recording system.

These and other objects, features, advantages and alternative aspects of the present invention will become apparent to those skilled in the art from a consideration of the following detailed description, taken in combination with the accompanying drawings.

BRIEF DESCRIPTION OF THE DRAWINGS

FIG. 5A is a graph showing how air responds increasingly non-linearly as the amplitude or intensity of sound increases.

DETAILED DESCRIPTION OF THE INVENTION

Reference will now be made to the drawings in which the various elements of the present invention will be given numerical designations and in which the invention will be discussed so as to enable one skilled in the art to make and use the invention.

Figure 1:
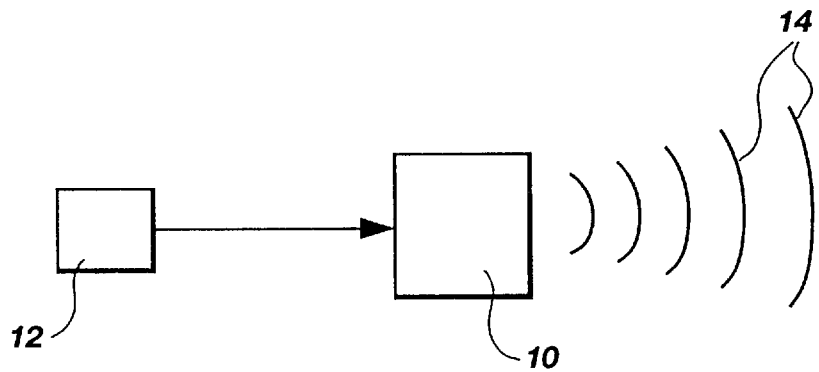
FIG. 1 is a block diagram of the components of a state of the art conventional loudspeaker system.

The present invention is a dramatic departure from the teachings of the present state of the art. The creation of compression waves is generally perceived to be a direct process. A direct process is defined as causing a radiating element 10 to vibrate at a desired frequency as shown in FIG. 1. The system of FIG. 1 is typically used to directly generate audible and inaudible compression waves, both above and below the range of human hearing. A conventional compression wave generating system is thus comprised of a speaker element 10 which can be any dynamic, electrostatic or other direct radiating element, and a signal source such as a signal generator or amplifier 12. The signal source 12 supplies an electrical signal representative of a compression wave having a specific frequency or frequencies at which the speaker element 10 will vibrate to produce compression waves 14.

To improve the quality of sound from a sound reproduction system such as in FIG. 1, a person skilled in the art presently looks at ways to improve the physical radiating element, such as the loudspeaker 10. The loudspeaker 10 functions as a transducer, attempting to accurately reproduce sound recorded in an analog or preferably a digital format by converting an electrical signal into compression waves 14. Therefore, generating compression waves has previously been a direct process as defined above. The reproduced sound is generated directly by a physical radiating element which vibrates at the frequency or frequencies which drive it. This vibration typically drives a loudspeaker cone or diaphragm, which creates compression waves the human ear can hear when within the range of 20 to 20,000 cycles per second. For example, if the diaphragm vibrates at 1500 cycles per second, an audible tone of 1500 Hz is generated.

Before proceeding further, it will be helpful to define several terms to be used hereinafter. A "signal source" will interchangeably refer to a "signal generator" or "amplifier" which provides electrical signals representative of compression waves to be emitted from a speaker. The term "speaker" will interchangeably refer to the terms "transducer", "emitter", "loudspeaker", "diaphragm", "physical radiating element" or "direct radiating element" which converts the electrical signals to a mechanical vibration causing compression waves. The term "compression wave" will interchangeably refer to the terms "sound wave", "longitudinal wave" and "wave train" which are sonic, subsonic and ultrasonic waves propagating through a transmission medium such as air.

The present invention in a preferred embodiment teaches a method and apparatus for indirectly generating a new compression wave. Indirect generation refers to the absence of a direct radiating element at the source of the new compression wave generation. Surprisingly, there is no physical radiating element vibrating at the frequency of the newly generated compression wave. Instead, air molecules are caused to vibrate at the desired sonic, subsonic or ultrasonic frequency to thereby function as the radiating element and generate the new compression wave. The air itself becomes the direct radiating element, and becomes an indirect source of the compression wave.

Of greatest interest to the present invention are both sonic and subsonic frequencies. This is largely due to the difficulty of directly generating these frequencies without distortion. In contrast, it is the nature of ultrasonic frequencies to be capable of generation with much greater precision and with less distortion. This occurs because the radiating element is typically more efficient, smaller in size, and is less massive. Accordingly, the ultrasonic radiating element is not subject to the same causes of distortion or to the same degree as are conventional speakers. Although it should be remembered that the invention can generate new compression waves at ultrasonic, sonic or subsonic frequencies indirectly, the present focus looks at more significant applications with respect to reproduction of music, voice and all other forms of sound.

To generate a new compression wave, the present invention 1) makes use of at least two ultrasonic signals, 2) superimposes a desired sonic or subsonic signal onto one or both of the ultrasonic signals, 3) emits the ultrasonic signals from at least one ultrasonic emitter 4) causes the ultrasonic signals to interfere according to the principles of acoustical heterodyning, and 5) generates a new compression wave from a region of heterodyning interference of the ultrasonic compression waves.

The advantages of this arrangement are immediately observable. For example, the ultrasonic component waves do not impact upon the human ear in a perceptible form and are therefore non-distracting. Consequently, only the desired new compression wave is perceived by a listener and in a form capable of recreating the original dynamics of more ideal sound reproduction.

Figure 2:
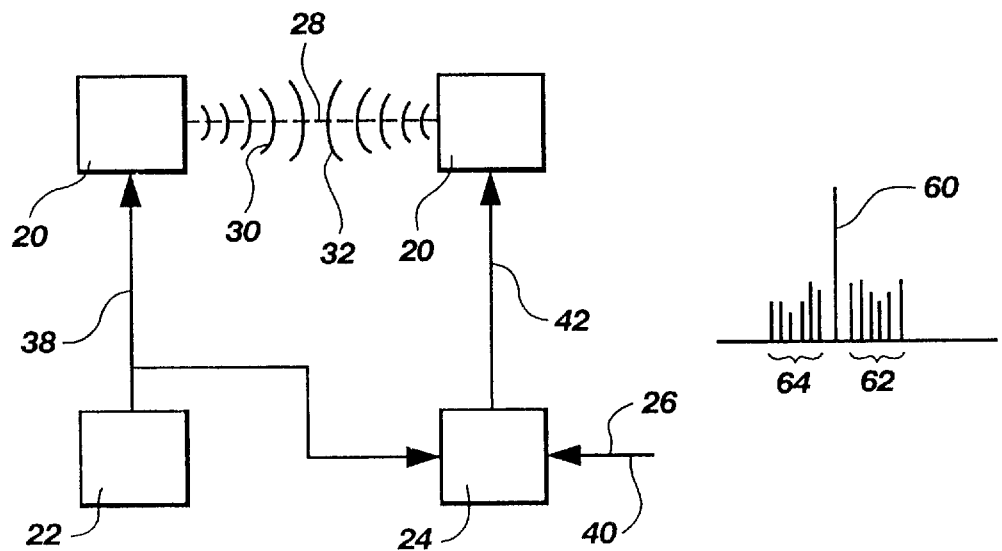
FIG. 2 is a block diagram of the components of an indirect compression wave generation system which is built in accordance with the principles of one embodiment of the present invention.

Introduction of the present invention is best understood by reference to FIG. 2. Other preferred embodiments will be explained hereafter, based on the principles of this initial discussion.

Indirect compression wave generation is accomplished in a first embodiment as illustrated in FIG. 2. The fundamental elements of the system include at least two ultrasonic acoustical transducers 20, an ultrasonic signal source 22, a means for combining signals 24, and an input 26 to the means for combining signals which provides a signal to be superimposed upon a carrier signal. The ultrasonic signal source 22 also functions as a means for controlling the frequency of signals being emitted from the at least two ultrasonic acoustical transducers 20. The dotted line 28 indicates that in this first embodiment, the orientation of the transducers 20 are coaxial.

The apparatus above is able to function as described because the compression waves 30, 32 interfere in air according to the principles of acoustical heterodyning (a phrase chosen by the inventor which describes the effect). Acoustical heterodyning is somewhat of a mechanical counterpart to the electrical heterodyning effect which takes place in a non-linear circuit. For example, amplitude modulation in an electrical circuit is a heterodyning process. The heterodyne process itself is simply the creation of two new waves. The new waves are the sum and the difference of two fundamental waves.

In acoustical heterodyning, the new waves equalling the sum and difference of the fundamental waves are observed to occur when at least two ultrasonic compression waves interact or interfere in air. Presently, acoustical heterodyning has only been observed when both fundamental waves are ultrasonic, thus generally above 20 KHz.

The preferred transmission medium of the present invention is air because it is a highly compressible medium that responds non-linearly under different amplitudes. This non-linearity of air is what enables the heterodyning process to take place without using an electrical circuit. However, it should be remembered that any compressible fluid can function as the transmission medium if desired.

Figure 3:
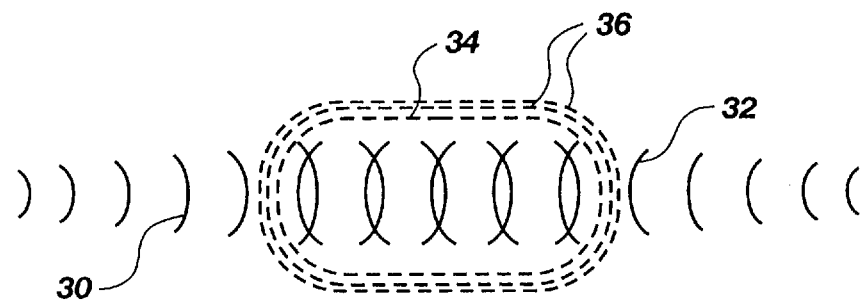
FIG. 3 is an illustration of the indirect and new compression wave generation using the apparatus of FIG. 2, including the acoustical heterodyning interference effect.

FIG. 3 illustrates that the indirect generation of a new compression wave is made possible by the unexpected discovery that two ultrasonic wave trains 30, 32 experience a form of the acoustical heterodyning effect in a non-linear acoustical transmission medium such as air when they interfere. Air will respond more and more non-linearly in a region 34 as amplitude and frequency increase. This region 34 will extend as far as the compression waves 30, 32 are interfering with each other.

As related above, the acoustical heterodyning effect results in the creation of two new compression waves, the sum and the difference of ultrasonic compression waves 30, 32. The sum is an ultrasonic wave which is of little interest and is therefore not shown. The difference, however, can be sonic or subsonic, and is shown as a compression wave 36 which is emitted generally omni-directionally from the region of interference 34. The shape of the new wave is generally dictated by the shape of the region of interference 34. In this illustration, the region 34 will be generally cylindrical as would be seen if drawn in three dimensions. The shape of the region 34 can, however, be modified to produce a desired effect. Furthermore, the illustration of opposing and generally coaxial compression waves 30, 32 should not be thought to depict the only orientation that the waves can have.

It is worth noting before proceeding further that the acoustical heterodyning effect has been proven empirically. The evidence lies in the fact that at least one new wave is created. The new sonic or subsonic compression wave 36 is verifiable by direct audible detection as well as by measuring the frequency with an audio spectrum analyzer. However, unlike direct audible detection, the sum of both frequencies can only be verified through measurement using an instrument such as the audio spectrum analyzer. Both the sum and the difference have been measured to verify the accuracy of these predicted results.

As can be surmised, the particular acoustical heterodyning effect which is of interest to the present invention is the difference or frequency subtraction of one ultrasonic wave train relative to another. Consider a specific example which explicitly provides the result of acoustically heterodyning two different ultrasonic compression waves 30, 32. Assume the existence of a first ultrasonic frequency wave train (first fundamental wave) 30 of 100,000 Hz. Assume a second ultrasonic wave train (second fundamental wave) 34 occurs at 100,900 Hz. An audible tone of 900 Hz is heard as the result of the first and the second ultrasonic wave trains interacting when one or both are of sufficient amplitude. The frequency subtraction caused by the acoustical heterodyning effect results in a 900 Hz frequency tone being generated and heard as a new compression wave from a region of interference.

The generation of a single-frequency merely illustrates the core inventive principle. A greater appreciation of potential for acoustic heterodyning is found in the following applications. For example, if a single new uni-frequency compression wave can be generated, it should be realized that even bass intense, multi-frequency signals such as live music, a voice or a transmission received via radio or television can be amplified and played using the present invention. A tiny ultrasonic frequency transducer in a pocket can conceivably reproduce with perfect clarity all the recorded frequencies of a live symphonic recording, perhaps even approaching the experience of being there.

Returning to a more detailed discussion of specific elements of FIG. 2, an important and practical element of the invention is the single ultrasonic signal source 22 being used to supply the electrical signals representing the ultrasonic frequency wave trains 30, 32. The advantage of this arrangement is that signal differences that might otherwise occur due to variations in temperature or performance of two separate signal generators would likely lead to drift between the frequency values of the ultrasonic wave trains 30, 32. Furthermore, because it is the difference in frequency between the two ultrasonic wave trains 30, 32 which is ultimately the frequency of interest, it is important to minimize unwanted frequency variations of the ultrasonic wave trains 30, 32.

To eliminate drift, a single ultrasonic output source 22 generates a base frequency for both ultrasonic wave trains 30, 32 so that the wave trains 30, 32 will drift together, if at all. This configuration thus makes it easier to precisely control the difference in frequencies and ultimately the frequencies of the new compression wave.

FIG. 2 also lists as a component of the system a means for combining signals 24. This device performs the function of modifying one or both of the ultrasonic wave trains 30, 32 being generated by the ultrasonic signal source 22. This modification consists of the means for combining signals 24 by combining a first ultrasonic signal 38 with an electrical signal 40, representing the new compression wave 42 to be generated. The combination is defined as the sum of the first ultrasonic signal 38 and the desired compression wave 42 and is transmitted as the second ultrasonic signal 42.

The method of combining signals 38 and 40 in the present invention is preferably accomplished through amplitude modulation. Therefore the means for combining signals 24 in the first embodiment is an amplitude modulator. FIG. 2A illustrates that amplitude modulation creates a signal having a fundamental frequency 60, an upper sideband 62, and a lower sideband 64. In this invention, the upper sideband 62 is used because it represents a non-inverted signal which carries the information that will become the new "difference" compression wave.

It might be apparent that if the electrical signal which will become the new compression wave 62 is amplitude modulated onto a fundamental frequency 60, that the ultrasonic compression wave 30 or 32 (whichever is being modulated) needs no demodulation in order to be heard as the new compression wave 62. The last elements of the system shown in FIG. 2 are the two ultrasonic acoustical transducers 20. These acoustical transducers 20 are designed to emit compression waves at ultrasonic frequencies. Examples of transducers 20 can be piezoelectric or electrostatic devices, but may obviously include other radiating elements for the appropriate frequency range.

Figure 4:
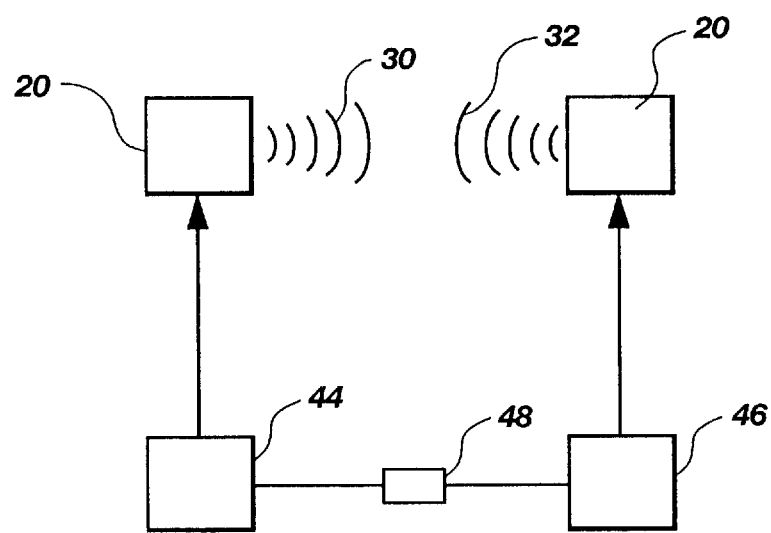
FIG. 4 is a block diagram of the components of an indirect compression wave generation system.

While the first embodiment uses a single ultrasonic signal source 22, it should be realized that it is possible to provide separately generated electrical signals to the ultrasonic transducers 20. FIG. 4 illustrates using two separate ultrasonic signal sources 44, 46. The risk of this configuration is that frequency drift becomes a possibility. As a practical matter, this embodiment might also require some type of synchronization between the two ultrasonic signal sources 44, 46. For example, a synchronizing controller 48 might coordinate emission of the two ultrasonic frequency signals 30, 32.

FIG. 5A is a graph provided to illustrate the principle of acoustical heterodyning by showing the relationship between the amplitude of a signal and the non-linearity of air in response to that signal. The restoring force is the force which a molecule of air will exert to get back to equilibrium when it is displaced. If air were linear, Newton's laws would teach us that air would respond to a given force which displaces it with an equal and opposite force. However, the graph illustrates that the restoring force does not respond linearly (which would be represented by a straight line) as the amplitude of a signal increases. Instead, the equation of the curve 52 is $y=x+x^2$, where air responds with a linear component x, as well as a non-linear component $x^2$. The curve 52 thus represents that as amplitude of a signal becomes significant, the non-linear response of air begins to increase more rapidly than the linear component in accordance with the equation.

Figure 5B:
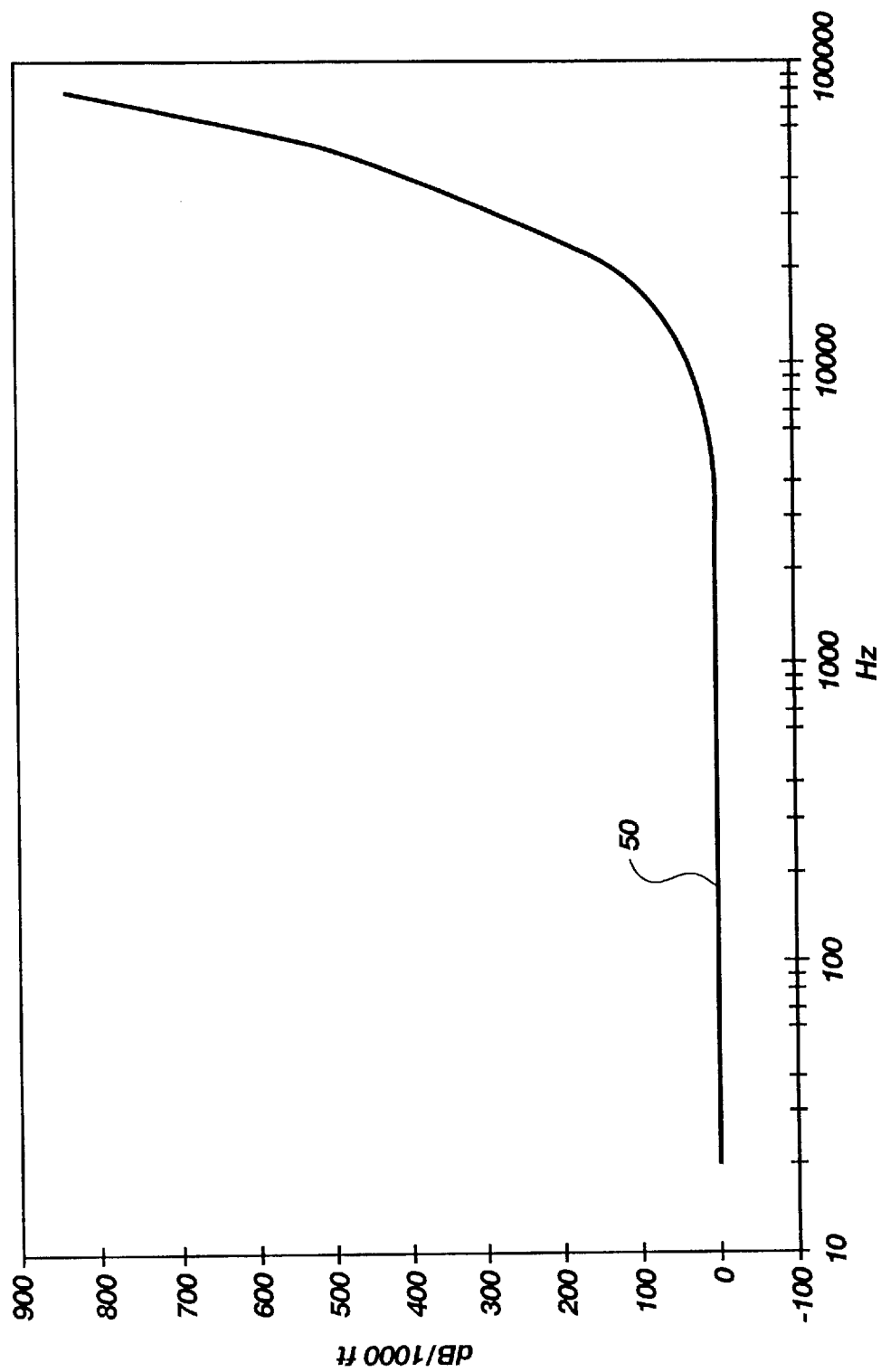
FIG. 5B is a graph showing when air responds non-linearly to a specific signal of a defined frequency and amplitude.

FIG. 5B is a graph provided to illustrate properties which the signal must exhibit so that air will respond to it non-linearly. The x-axis represents frequency of the signal on a logarithmic scale. The y-axis represents the degree of absorption in air by dB per 1000 feet. As shown, the line 50 is nearly flat up to about 10 KHz. This is consistent with the experimental results confirming that sound waves at lower amplitudes do not appear to develop significant acoustical heterodyning. Air becomes substantially more non-linear as amplitude increases, thus enabling interference in accordance with the principles of acoustical heterodyning.

Figures 6A, 6B:
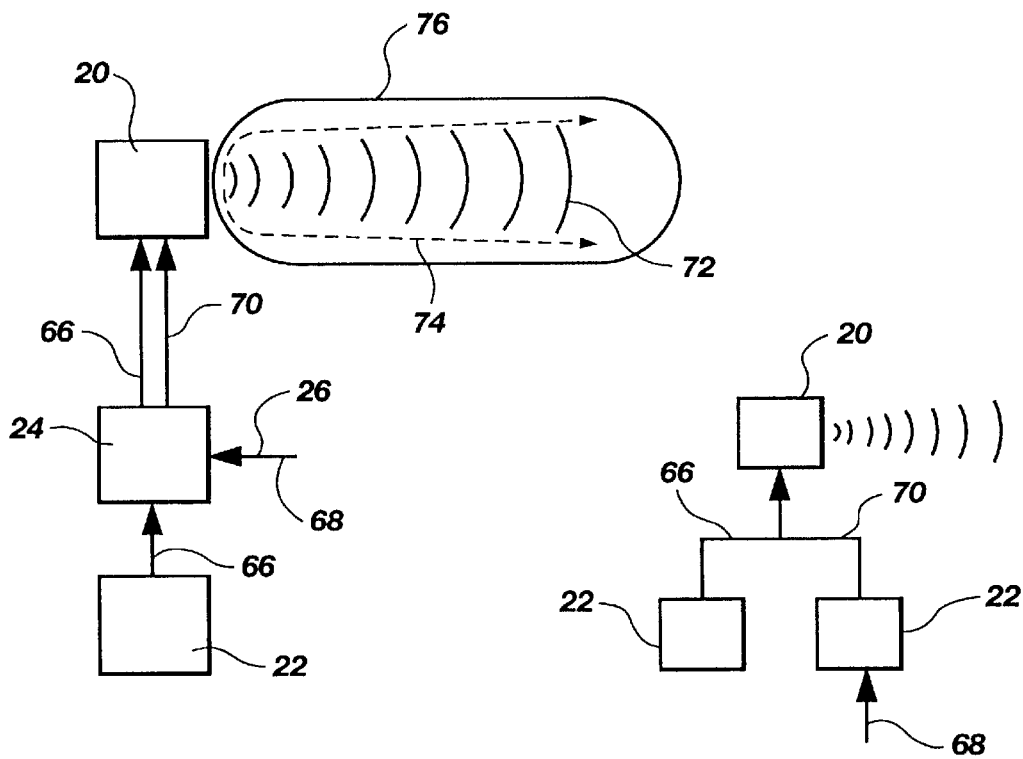
FIG. 6A is a block diagram of the components of an indirect compression wave generation system.
FIG. 6B is an alternative embodiment of FIG. 6A.

FIG. 6A illustrates the preferred embodiment of the invention. In a comparison with FIG. 2, a significant difference is the elimination of one ultrasonic transducer 20. Otherwise, the remaining ultrasonic transducer 20, the means for combining signals 24 and the ultrasonic signal source 22 remain substantially the same. It would seem counter-intuitive, however, to think that this arrangement is still able to accomplish the objectives of the present invention. However, an analysis of the ultrasonic compression wave being emitted quickly proves that the acoustical heterodyning effect is still taking place.

First, the electrical signals involved are the first ultrasonic signal 66 which is the fundamental wave, and the electrical signal 68 which represents the new sonic or subsonic wave to be combined with the ultrasonic signal 66. The combination of the signals 66, 68 creates a new electrical signal 70 composite as a new upper sideband that is the sum of signals 66 and 68, along with signal 66, both of which are emitted from the ultrasonic transducer 20 as a compression wave 76.

A listener will hear the new compression wave 76 from a region of interference 74 which generally can begin at a transmitting face of the ultrasonic transducer 20. Except for the audible evidence to the contrary, this might lead the listener to incorrectly conclude that the ultrasonic transducer 20 is generating the new compression wave 76. By definition, the ultrasonic transducer 20 cannot directly generate audible frequencies. Therefore, what one hears is the interfering ultrasonic compression waves interacting in accordance with the acoustical heterodyning effect. It was discovered that the two ultrasonic compression waves are created from 1) the new electrical signal 70, and 2) the first ultrasonic signal 66. These respective compression waves corresponding to signals 66 and 70 are propagated at the transducer 20, providing the required two ultrasonic wave trains for acoustical heterodyning interference.

FIG. 6B is also provided to show an alternative arrangement of components which more intuitively illustrates the two distinct ultrasonic compression waves 66 and 70 being transmitted to the ultrasonic transducer 20 for emission therefrom. The only meaningful difference between the two embodiments is that separate ultrasonic signals sources 22 are shown for each of the ultrasonic compression waves.

The embodiments of FIG. 6A or 6B are preferred for many reasons. For example, the systems have one less transducer 20, and will therefore be less expensive to produce. The systems will also be lighter, smaller and, most importantly, will have the greatest efficiency.

The aspect of efficiency requires further discussion to understand some of the implications of the various embodiments. Whereas the first embodiment shown in FIG. 2 requires orientation of the ultrasonic transducers 20, no orientation is required in FIG. 6 because the single transducer 20 functions as the radiating element for both interfering signals.

Figures 7, 8:
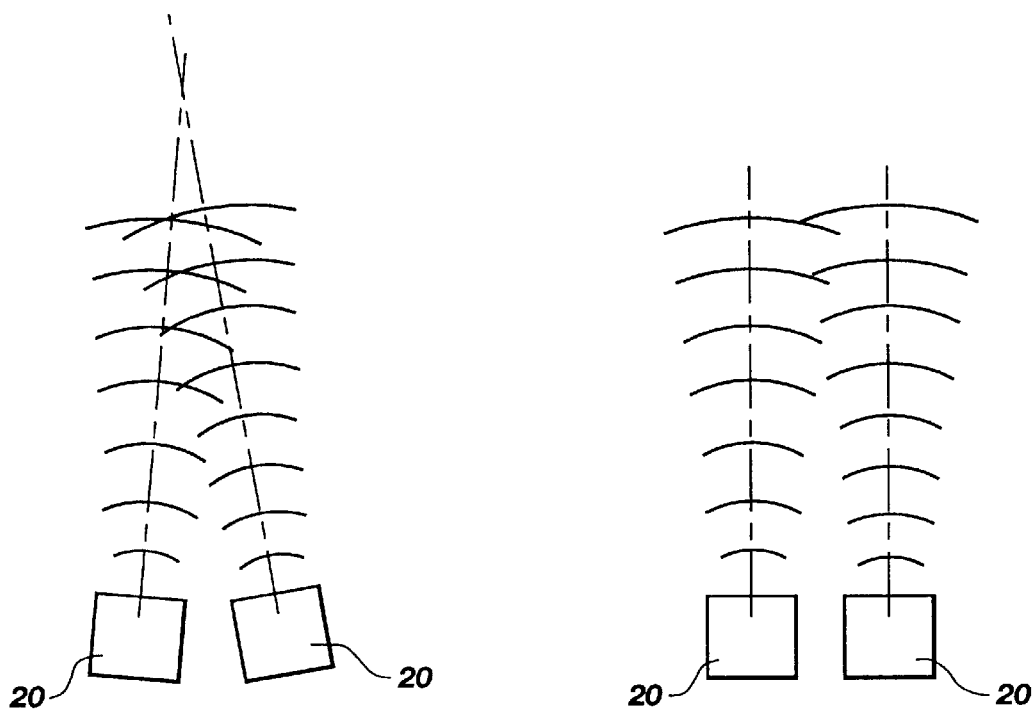
FIG. 7 is an alternative configuration of ultrasonic frequency transducers to indirectly generate compression waves.
FIG. 8 is another alternative configuration of ultrasonic frequency transducers to indirectly generate compression waves.

Orientation of ultrasonic transducers 20 is important because the system of FIG. 1 can be altered so as not to generate any new compression wave. For example, if the transducers 20 are oriented so that the ultrasonic compression waves 30, 32 never substantially cross, no new compression wave can be created. Therefore, FIG. 7 showing a slightly convergent path and FIG. 8 showing a generally parallel path both depict ultrasonic transducer 20 orientations which will generally create sufficiently large regions of interference so that a new compression will be generated. However, neither of these orientations appear to generate as significant a region of interference as the orientations of FIGS. 1 or 6. due to the greater degree of interference represented. This greater efficiency translates into greater energy transfer to the new compression wave and consequently to a stronger or louder new wave.

In contrast, the preferred embodiment will always generate a new compression wave which has the greatest efficiency. That is because no orientation of two ultrasonic transducers 20 will ever match or exceed the perfect coaxial relationship obtained when using the same ultrasonic transducer 20 to emit both ultrasonic compression waves. This coaxial propagation from a single transducer would therefore yield the maximum interference pattern and most efficient compression wave generation.

Before moving to other aspects of the invention, it is important to realize that unusual sound effects are possible with the highly directional ultrasonic transducers 20. It has been observed that reflecting the at least two ultrasonic wave trains at an object or surface causes the reflected waves to give an impression of localized source. In other words, the reflected new compression wave appears to be coming from the object or surface of reflection.

Figure 13:
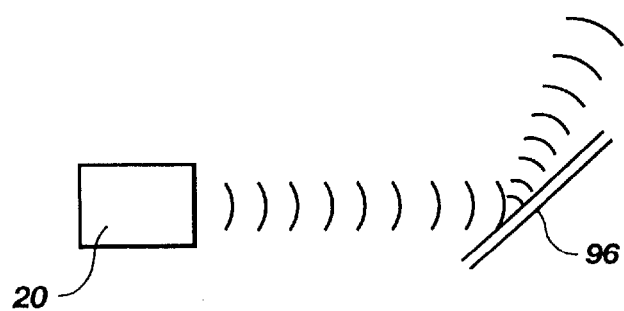
FIG. 13 is an embodiment which teaches reflection of the ultrasonic frequency signals to develop acoustical effects.

This is represented in FIG. 13 and can be used to simulate a variety of interesting acoustical effects, including three dimensional sound. By simply directing the orientation of the ultrasonic transducer 20 toward a ceiling or wall 96, one can simulate the experience of sound emanating from that location. If the transducer target is placed in motion, the moving reflective location creates an impression of movement for the sound or object being represented. By controlling the orientation of the transducer with computer drivers, sound reproduction can be localized to individual faces on a movie screen or even off the screen in an overhead position, moving vehicles or aircraft, or any myriad of other sound effects which can now only be imagined.

A startling consequence of the present invention is the generation of a new omni-directional compression wave. Specifically, the new compression wave will generally radiate outward omni-directionally from a region of interference, generally in accordance with the shape of the region. However, the remarkable control which the present invention provides over the shape of the region of interference enables a perception of the described directionality to be manipulated in unexpected ways.

For example, one or two ultrasonic transducers might be aimed at a wall or other object. The increased amount of interference between two ultrasonic compression waves which will occur because of the reflection will cause most of the sound to be generated omni-directionally from near the object being reflected from. Likewise, bringing the two ultrasonic frequency transducers 20 of FIG. 2 closer together limits the length of interference and consequently more closely approximates a near point-source of sound.

Another significant advantage of the present invention is that sound is reproduced from a relatively massless radiating element. In the region of interference, and consequently at the location of new compression wave generation, there is no direct radiating element. This feature of sound generation by acoustical heterodyning can substantially eliminate distortion effects, most of which are caused by the radiating element or conventional speakers. For example, harmonics and standing waves on a loudspeaker cone, cone overshoot and cone undershoot caused by inertia, and the imperfect surface of the cone itself are all factors which contribute to signal distortion attributable to a direct radiating element.

A direct physical radiating element has other undesirable characteristics as well. Despite certain manufacturer claims to the contrary, the frequency response of a conventional loudspeaker is not truly flat. Instead, it is a function of the type of frequency (bass, intermediate, or high) which it is inherently best suited for emitting. Whereas speaker shape, geometry, and composition directly affect the inherent speaker character, acoustical heterodyne wave generation utilizes the natural response of air to avoid geometry and composition issues and to achieve a truly flat frequency response for sound generation.

In general, it should be noted that this aspect of the present invention means that the final step in achieving truly indirect sound generation has been achieved. While the state of the art has advanced the ability to convert an analog signal to a digital recording, and to even process the signal digitally, the quality of sound reproduction remains limited by the characteristics of the analog transducer which has always been required as a speaker element. This is no longer the case because the present invention achieves distortion free sound which is not hindered by a direct radiating element, with its attendant mass and inertial limitations.

Distortion free sound implies that the present invention maintains phase coherency relative to the originally recorded sound. Conventional speaker systems do not have this capacity because the frequency spectrum is broken apart by a cross-over network for propagation by the most suitable speaker element (woofer, midrange or tweeter). By eliminating the direct radiating element, the present invention makes obsolete the conventional cross-over network. This enables realization of a virtual or near point-source of sound.

Another application of the present invention involves unobtrusively generating crowd-controlling subsonic sound waves. Very low frequencies, such as those around 12 Hz, have been shown to nauseate or disorient human beings and other animals. Prior efforts in using low frequency disorientation has been hampered by a limited ability for localized application. The present invention has demonstrated its adaptation for reflected amplification, and thereby allows a more focused field of influence. For example, acoustic heterodyne generation of low frequency sound could be directed to a building, window or other reflective surface near a group of disorderly persons. The primary affect of this disorienting sound would be in the immediate area of reflection, avoiding undesirable application to innocent bystanders.

Other advantages arise directly from the unique nature of the ultrasonic transducers 20. Because of their small size and low mass, such transducers are generally not subject to the many limitations and drawbacks of conventional radiating elements used in loudspeakers. Furthermore, the use of ultrasonic transducers 20 at extremely high frequencies avoids the distortion, harmonics and other undesirable features of a direct radiating element which must reproduce sound directly in the low, mid and high frequency ranges. Consequently, the many favorable acoustic properties of a relatively distortion free ultrasonic transducer system can now be transferred indirectly into sonic and subsonic by-products.

Figure 9:
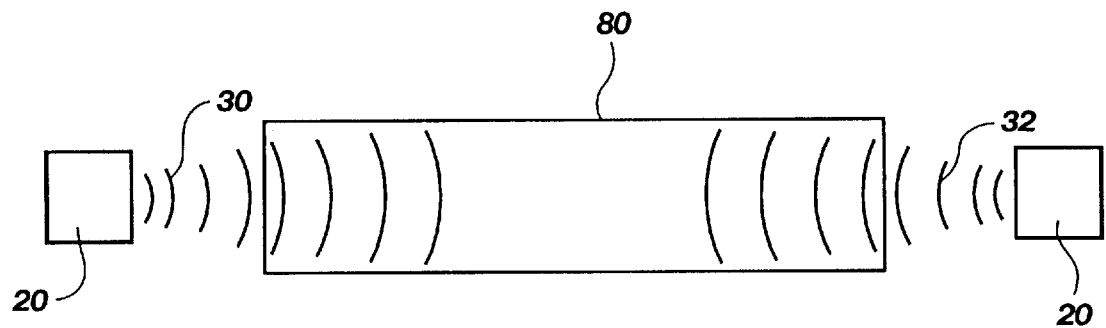
FIG. 9 is an illustration of a resonant cavity with two ultrasonic frequency signals being emitted from two transducers.

FIG. 9 illustrates an additional aspect of the present invention relating to an ability to generate and enhance sound within a broadly resonant cavity 80. A resonant cavity 80 is any cavity 80 which enables interacting ultrasonic compression waves 30, 32 to interfere in accordance with the principles of acoustical heterodyning. Although the broadly resonant cavity 80 is not necessary to create the effect of interference, it seems to enhance or amplify the effect by increasing interference, as well as reinforcing the audio byproduct or "difference" frequencies. This means that two ultrasonic frequency signals 30, 32 can be transmitted into the cavity 80 from almost any perspective. For example, FIG. 9 shows two ultrasonic frequency transducers 20 emitting ultrasonic frequency signals 30, 32 into cavity 80. The signals 30, 32 are reflected off the walls of cavity 80 a multiple numbers of times to increase interference.

Figure 10:
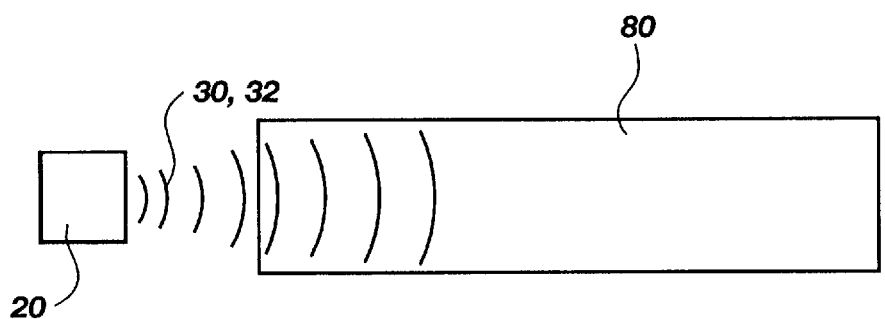
FIG. 10 is an illustration of a resonant cavity with two ultrasonic frequency signals being emitted from one transducer.

FIG. 10 shows an improved configuration of the broadly resonant cavity of FIG. 9 which only requires a single ultrasonic transducer 20 to generate a new compression wave. The system is improved because of the perfect coaxial relationship between the two ultrasonic compression waves 30, 32.

Figure 11:
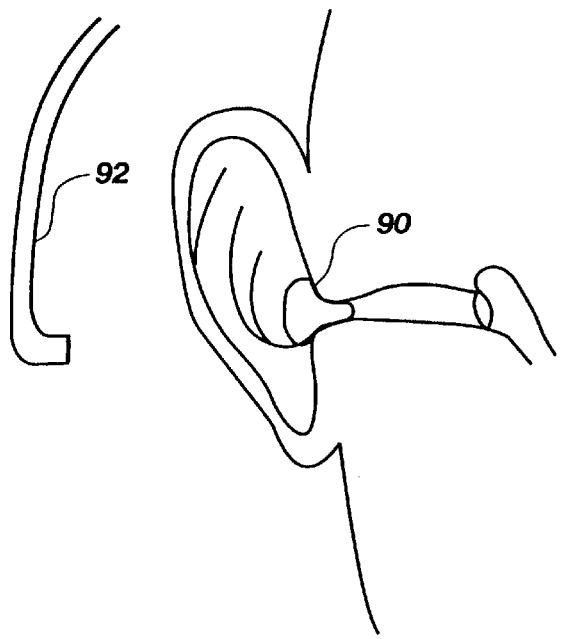
FIG. 11 is a diagram of a hearing aid and headphones where the human ear canal is the resonant cavity.

One implication of the broadly resonant cavity 80 of FIGS. 9 and 10 is that the human ear canal is also a broadly resonant cavity, and can thus be used to enhance the new compression wave. This result offers a particular advantage for the headphone and hearing aid industry. For example, a hearing aid 90 as shown in FIG. 11 which embodies the present invention can be used to reproduce the entire audio spectrum of sounds for a listener, enabling a high fidelity reproduction, rather than the characteristic "tinny" sound of a conventional hearing aid. Likewise, any headphone or headset 92 can be modified to take advantage of the present invention, and generally with less weight and size than conventional systems with a dramatic extension to frequency response.

Another interesting aspect of the invention facilitates privacy of communication as part of a wireless system. This arises because of the "beaming" effect inherent with the use of an ultrasonic transducer 20. By nature, ultrasonic compression waves propagate in a narrow beam, which can easily be targeted on specific objects or locations. It is therefore possible to aim a transducer 20 across a noisy or crowded room and direct audible messages only into an ear of an intended listener. Those around the listener would be unaware of the audible communication because of the non-reflective character of the ear and the narrow beam width of the ultrasonic waves. Private instructions could therefore be given on radio and television production areas, performance stages for cueing, and other applications where one-way prompting would be helpful.

Surprisingly, the present invention can also eliminate unwanted environmental noise pollution. Our society has coined the phrase "boombox" to refer to portable stereo systems which have relatively large bass speakers. The boombox derives its name from the annoying side affect of a booming and repeated "thump" of the bass speakers driving large volumes of air. However, the term is also sometimes used to refer to a car or other vehicle with even larger bass speakers. Because the speakers are integrally attached to the vehicle, the frame or any loudspeaker enclosure in general, the enclosure itself becomes a radiating element. Consequently, persons outside the vehicle will be hit with wave upon wave of dull thumping sounds, a nuisance at best.

The present invention can thus advantageously eliminate the coupling of the enclosure to the direct radiating element by generating the new compression wave in midair. The listener inside can still enjoy the experience of loud bass frequencies within the confines of the vehicle. However, the lower frequencies will not be directly coupled to the vehicle frame because the radiating element is now a point in air. Consequently, undesirable bass broadcasting into the environment beyond the immediate vicinity of the listener is significantly reduced.

Figure 12:
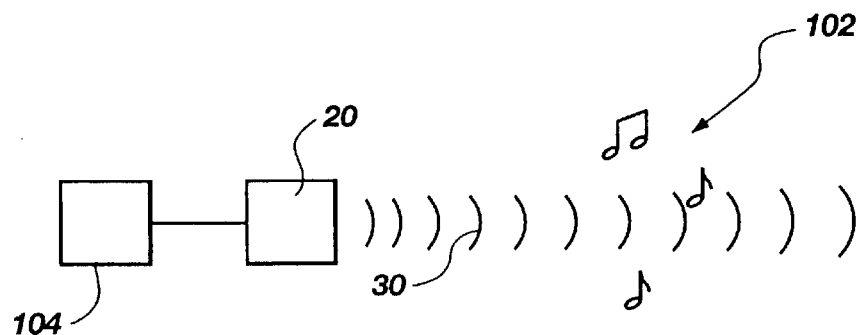
FIG. 12 is a block diagram illustrating using the present invention to detect sound.

An interesting twist of the invention is a reverse application of the technology for sound detection. In other words, instead of reproducing sound, the invention might be used to detect sound as shown in FIG. 12. More specifically, the invention can function as a substitute for a point-source sound detection device such as a microphone. Typically, a microphone must be physically positioned at a desired location of sound detection in order to operate. The present invention enables compression waves to be converted into an electrical signal by a transducer 20 without providing a physical microphone element at a detection location.

Essentially, a single transducer 20 might be used to focus ultrasonic compression waves 30 at the desired detection location 102. Acoustical vibrations, such as a voice or music, will interact with the ultrasonic compression wave 30. By monitoring a decrease in output level of the ultrasonic compression wave 30, it should be possible to determine the frequencies of the audible compression wave which is impacting on the ultrasonic compression wave 30. This might be done by using a waveform analyzer 104 to determine the decrease in output level caused by coupling of the ultrasonic compression wave 30 with the audible sound waves 102. It is to be understood that the above-described embodiments are only illustrative of the application of the principles of the present invention. Numerous modifications and alternative arrangements may be devised by those skilled in the art without departing from the spirit and scope of the present invention. The appended claims are intended to cover such modifications and arrangements.

It is to be understood that the preceding description is given to illustrate various embodiments of the present inventive concepts. The specific examples are not to be considered as limiting, except in accordance with the following claims.

What is claimed is:

1. A system for indirectly generating and enhancing at least one audible frequency from within a resonant cavity by interaction between at least two ultrasonic frequency signals of different frequency, said system comprising:

a resonant cavity which enables interacting ultrasonic signals to interfere in accordance with acoustic heterodyning to generate an audible sound output within air contained within the resonant cavity, said resonant cavity including an opening for permitting entry of the ultrasonic signals;

an ultrasonic frequency emitter contained within one of a stereo headphone, a hearing aid, or an audio headset, said emitter being directed toward the opening of the resonant cavity for transmitting first and second ultrasonic signals along a common axis into the resonant cavity without indirect reflection from other sources;

modulating means coupled to the ultrasonic frequency emitter for generating the second ultrasonic frequency having a difference in value relative to the first ultrasonic frequency which is equal to the at least one audible frequency;

means for concurrently operating the ultrasonic frequency emitter and the modulating means to generate the first and second ultrasonic signals, and means for directing the first and second ultrasonic signals into the resonant cavity.

2. The system as defined in claim 1 wherein the resonant cavity has a configuration corresponding to a human ear canal.

3. A method for indirectly generating and enhancing at least one audible frequency from within a resonant cavity using at least two ultrasonic signals of different frequency the method comprising the steps of:

1) transmitting a first ultrasonic signal into the resonant cavity using an emitter contained within one of a stereo headphone, a hearing aid, or an audio headset;
2) concurrently transmitting a second ultrasonic signal from said emitter into the resonant cavity along a common axis with the first ultrasonic signal wherein the second ultrasonic signal has a frequency which differs from the first ultrasonic signal by a value generally equal to the at least one audible frequency, and wherein the resonant cavity amplifies the interference between the first and the second ultrasonic signals;
3) whereby at least one audible frequency arises from the interference of the first and the second ultrasonic signals within the resonant cavity.

4. A method for indirectly generating omni-directional sound as part of an audio sound system for entertainment use by a listener and having a remote virtual source distant from the listener, said omni-directional sound comprising at least one new sonic or subsonic wave train which is a difference of at least two interacting ultrasonic wave trains having frequencies of different value, the method comprising the steps of:
1) emitting a first ultrasonic wave train including a base frequency into a region of air from a transducer means;
2) concurrently emitting a second ultrasonic wave train from said transducer means into the region to thereby interact with the first ultrasonic wave train wherein the second ultrasonic wave train has a base frequency equal to the base frequency of the first ultrasonic wave train and is projected along a common axis for both the first ultrasonic wave train and second ultrasonic wave train, which common axis is the only transmission path between said transducer means and a reflective surface of an object which is distant from the listener;

varying the base frequency of the second ultrasonic wave train through a frequency range corresponding to a sum of the base frequency and the new audible sound wave train; and 4) reflecting the first and second ultrasonic wave trains from said a reflective surface to generate omni-directional dispersion of audible sound leaving a virtual, localized sound source at the reflective surface.

5. The method as defined in claim 4 wherein the method comprises the additional step of generating both the (i) first ultrasonic frequency and (ii) the second ultrasonic frequency from a single ultrasonic generating means, thereby eliminating frequency drift between the first and the second ultrasonic frequencies.

6. A method as defined in claim 4, further comprising the step of controlling the movement and orientation of the wave train with a computer driver.

* * * * *